United States Patent [19]

Moriya et al.

[11] Patent Number: 4,590,248

[45] Date of Patent: May 20, 1986

[54] METHOD FOR PRODUCING A PLASTIC LENS USING TERTIARY ALKYL PEROXY ALLYL CARBONATE

[75] Inventors: Yasuo Moriya, Chita; Kazunori Kagei, Niu, both of Japan

[73] Assignees: Nippon Oil and Fats Co., Ltd., Tokyo; Asahi Optical Co., Ltd., Fukui, both of Japan

[21] Appl. No.: 478,022

[22] Filed: Mar. 23, 1983

[30] Foreign Application Priority Data

Mar. 29, 1982 [JP] Japan ................... 57-50701

[51] Int. Cl.$^4$ ............................ C08F 4/38; C08F 4/32
[52] U.S. Cl. ................... 526/228; 526/230.5
[58] Field of Search ............ 526/228, 232.5; 264/2.2, 2.6

[56] References Cited

U.S. PATENT DOCUMENTS

| | | | |
|---|---|---|---|
| 2,464,062 | 3/1949 | Strain | 526/314 |
| 3,038,210 | 6/1962 | Hungerford et al. | 264/2.6 |
| 3,119,802 | 1/1964 | Guillet et al. | 526/232.5 |
| 3,293,233 | 12/1966 | Erchak, Jr. et al. | 526/227 |
| 3,420,807 | 1/1969 | Harrison et al. | |
| 3,451,989 | 6/1969 | Rekers et al. | 526/232.5 |
| 3,872,042 | 3/1975 | Bond | |
| 4,126,737 | 11/1978 | Gruber | 526/314 |
| 4,260,564 | 4/1981 | Baiocchi et al. | 264/2.2 |
| 4,393,184 | 7/1983 | Tarumi et al. | |
| 4,396,737 | 8/1983 | Leatherman | |

FOREIGN PATENT DOCUMENTS

| | | |
|---|---|---|
| 0080338 | 11/1982 | European Pat. Off. |
| 2757440 | 7/1978 | Fed. Rep. of Germany |
| 50-45889 | 4/1975 | Japan |

*Primary Examiner*—Joseph L. Schofer
*Assistant Examiner*—Peter F. Kulkosky
*Attorney, Agent, or Firm*—Parkhurst & Oliff

[57] ABSTRACT

A plastic lens which has high hardness and excellent scratch resistance and can form a transparent and uniform reflection preventing film through vacuum deposition, is produced by mixing
(a) diethylene glycol bis(allyl carbonate) with
(b) at least one of organic peroxides having a decomposition temperature at selected half-life value for ten hours of not higher than 80° C. and
(c) at least one of specifically limited peroxycarbonates having a radical copolymerizability to the diethylene glycol bis(allyl carbonate) (a), as a polymerization initiator, and polymerizing and casting the resulting mixture in a desired lens-forming mold.

13 Claims, No Drawings

METHOD FOR PRODUCING A PLASTIC LENS USING TERTIARY ALKYL PEROXY ALLYL CARBONATE

BACKGROUND OF THE INVENTION

1. Field of the Invention

The present invention relates to a method for producing a plastic lens having high hardness and excellent scratch resistance by polymerizing and casting a diethylene glycol bis(allyl carbonate) in a desired lens-forming mold.

2. Description of the Prior Art

Plastic lenses produced by polymerizing and casting diethylene glycol bis(allyl carbonate) by using organic peroxides having a decomposition temperature at selected half-life value for ten hours of not higher than 80° C., particularly di-isopropyl peroxydicarbonate as a polymerization initiator, have been very important particularly as spectacle lenses, because plastic lenses have many characteristics not possessed by usual glass lenses and for example, are light in weight and dyeable.

However, plastic lenses have great drawbacks that they are readily scratched because of lower hardness than glass lenses. Therefore, for obviating this drawback, plastic lenses having equal surface hardness and scratch resistance to glass lenses, produced by applying a thermosetting resin such as a silicone resin, polyester resin, a melamine resin and the like or a polyfunctional monomer, such as allyl acrylate or ally methacrylate on surfaces of a plastic lens obtained from diethylene glycol bis(allyl carbonate) and thermosetting said resin or monomer, have been developed and are commercially available.

These plastic lenses wherein a thermosetting resin and the like have been applied on the surfaces of the lens have highly improved surface hardness and scratch resistance, but the excellent dyeability which is one of the great characteristics of plastic lenses is lost. Furthermore, new drawbacks have been caused by this method. For example, the steps for coating and curing the thermosetting resin are added and it is difficult uniformly to coat the thermosetting resin and the like on the surfaces of the lens, so that the precision of the surfaces of the lens is lowered and the production of lenses having complicated shapes becomes difficult. In addition, in plastic lenses, unpolymerized substances, such as diethylene glycol bis(allyl carbonate) remain in the lens different from glass lens, irrelative to the practice of the surface working and these remained substances make the uniform formation of reflection preventing film through vacuum evaporation difficult.

SUMMARY OF THE INVENTION

The inventors have studied the production of plastic lenses to obviate a variety of drawbacks possessed by the above described surface-worked plastic lenses and to produce such lenses which have high hardness and excellent scratch resistance and can form a transparent and uniform reflection preventing film by vacuum deposition. They have found a method for producing such plastic lenses by polymerizing diethylene glycol bis(allyl carbonate) by using an organic peroxide having a decomposition temperature at selected half-life value for ten hours of not higher than 80° C. (in benzene, 0.05 mol/l) together with a specific peroxide as a polymerization initiator. Thus has the present invention been accomplished.

The present invention lies in a method for producing plastic lenses by mixing (a) diethylene glycol bis(allyl carbonate) with (b) at least one of organic peroxides having a decomposition temperature at selected half-life value for ten hours of not higher than 80° C. and (c) at least one of peroxycarbonates having a radical copolymerizability to the above described diethylene glycol bis(allyl carbonate) (a), and represented by the following general formula

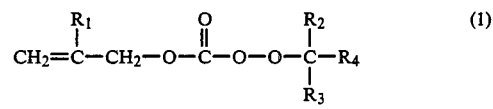

wherein $R_1$ represents a hydrogen atom or an alkyl group having 1–4 carbon atoms, $R_2$ and $R_3$ represent alkyl groups having 1–4 carbon atoms, and $R_4$ represents an alkyl group having 1–12 carbon atoms or a cycloalkyl group having 3–12 carbon atoms, as a polymerization initiator, and polymerizing and casting the resulting mixture in a desired lens-forming mold.

DESCRIPTION OF THE PREFERRED EMBODIMENTS

In the present invention, as the above described polymerization initiator (b), use may be made of at least one of organic peroxides selected from the group consisting of (I) peroxyesters, (II) peroxydicarbonates and (III) diacyl peroxides.

The above described peroxyesters (I) are at least one of organic peroxides selected from the group consisting of cumyl peroxyneodecanoate, tert.-butyl peroxyneodecanoate, tert.-butyl peroxypivalate, tert.-butyl peroxy(2-ethyl-hexanoate), and tert.-butyl peroxyisobutyrate.

The above described peroxydicarbonates (II) are at least one of organic peroxides selected from the group consisting of di-allyl peroxydicarbonate, di-methallyl peroxydicarbonate, di-isopropyl peroxydicarbonate, di-normalpropyl peroxydicarbonate, di-myristyl peroxydicarbonate, di-(2-ethoxyethyl) peroxydicarbonate, di-(methoxyisopropyl) peroxydicarbonate, di-(2-ethylhexyl) peroxydicarbonate and di-(3-methyl-3-methoxybutyl) peroxydicarbonate.

Furthermore, as the above described peroxydicarbonate (II), use may be made of di-isopropyl peroxydicarbonate.

The above described diacyl peroxides (III) are at least one of organic peroxides selected from the group consisting of 3,5,5-trimethylhexanoyl peroxide, octanoyl peroxide, decanoyl peroxide, lauroyl peroxide, acetyl peroxide, meta-toluyl peroxide and benzoyl peroxide.

In the present invention, as the above described peroxycarbonates (c), use may be made of at least one of peroxycarbonates selected from the group consisting of tert.-alkylperoxy allyl carbonate (IV), tert.-alkylperoxy methallyl carbonate (V), tert.-cycloalkylalkylperoxy allyl carbonate (VI) and tert.-cycloalkylalkylperoxy methallyl carbonate (VII).

In the present invention, the above described tert.-alkylperoxy allyl carbonates (IV) are at least one of peroxycarbonates selected from the group consisting of tert.-butylperoxy allyl carbonate, tert.-hexylperoxy allyl carbonate and 1,1,3,3-tetramethylbutylperoxy allyl carbonate.

Further, in the present invention, the above described tert.-alkylperoxy allyl carbonate (IV) is tert.-butylperoxy allyl carbonate.

The above described tert.-alkylperoxy methallyl carbonates (V) are at least one of peroxycarbonates selected from the group consisting of tert.-butylperoxy methallyl carbonate, tert.-hexylperoxy methallyl carbonate and 1,1,3,3-tetramethylbutylperoxy methallyl carbonate.

The above described tert.-cycloalkylalkylperoxy allyl carbonate (VI) is para-menthylperoxy allyl carbonate.

The above described tert.-cycloalkylalkylperoxy methallyl carbonate (VII) is paramenthylperoxy methallyl carbonate.

In the present invention, the above described organic peroxide (b) having a decomposition temperature at selected half-life value for ten hours of not higher than 80° C. is used in a concentration of 2-5% by weight, preferably 2.5-4% by weight, based on the above described diethylene glycol bis(allyl carbonate) (a), and the above described peroxycarbonate (c) is used in a concentration of 0.05-5% by weight, preferably 0.3-1% by weight, based on the above described diethylene glycol bis(allyl carbonate) (a).

Organic peroxides (b) having a decomposition temperature at selected half-life value for ten hours of not higher than 80° C. are listed in the following Table 1.

TABLE 1

| No. | Organic peroxide | | Decomposition temperature at selected half-life value for 10 hours (°C.) |
|---|---|---|---|
| 1 | Cumyl peroxyneodecanoate | (I) | 36.6 |
| 2 | Di-isopropyl peroxydicarbonate | (II) | 40.5 |
| 3 | Di-normal-propyl peroxydicarbonate | (II) | 40.5 |
| 4 | Di-myristyl peroxydicarbonate | (II) | 40.9 |
| 5 | Di-(2-ethoxyethyl) peroxydicarbonate | (II) | 43.4 |
| 6 | Di-(methoxyisopropyl) peroxydicarbonate | (II) | 43.4 |
| 7 | Di-(2-ethylhexyl) peroxydicarbonate | (II) | 43.5 |
| 8 | Di-(3-methyl-3-methoxybutyl) peroxydicarbonate | (II) | 46.8 |
| 9 | Tert.-butyl peroxyneodecanoate | (I) | 48.0 |
| 10 | Tert.-butyl peroxypivalate | (I) | 55.0 |
| 11 | 3,5,5-trimethylhexanoyl peroxide | (III) | 59.5 |
| 12 | Octanoyl peroxide | (III) | 61.0 |
| 13 | Decanoyl peroxide | (III) | 62.0 |
| 14 | Lauroyl peroxide | (III) | 62.0 |
| 15 | Acetyl peroxide | (III) | 68.0 |
| 16 | Tert.-butyl peroxy(2-ethyl hexanoate) | (I) | 72.5 |
| 17 | Meta-toluyl peroxide | (III) | 73.0 |
| 18 | Benzoyl peroxide | (III) | 74.0 |
| 19 | Tert.-butyl peroxyisobutyrate | (I) | 78.0 |
| 20 | Di-allyl peroxydicarbonate | (II) | 40.5 |
| 21 | Di-methallyl peroxydicarbonate | (II) | 40.0 |

In the above Table, classes (I), (II), and (III) are as follows
(I) peroxyesters
(II) peroxydicarbonates
(III) diacyl peroxides These organic peroxides are used alone or in combination of two or more peroxides. Particularly, it is preferable to use di-isopropyl peroxydicarbonate alone or in admixture with other organic peroxide.

When the specifically limited peroxycarbonates (c) represented by the general formula (1) are classified into
(IV) tert.-alkylperoxy allyl carbonate,
(V) tert.-alkylperoxy methallyl carbonate,
(VI) tert.-cycloalkylalkylperoxy allyl carbonate, and
(VII) tert.-cycloalkylalkylperoxy methallyl carbonate,
the peroxycarbonates (c) are, for example, (IV) tert.-butylperoxy allyl carbonate (IV) tert.-hexylperoxy allyl carbonate, (IV) 1,1,3,3-tetramethylbutylperoxy allyl carbonate, (VI) para-methylperoxy allyl carbonate, (V) tert.-butylperoxy methallyl carbonate, (V) tert.-hexylperoxy methallyl carbonate, (V) 1,1,3,3-tetramethylbutylperoxy methallyl carbonate and (VII) para-menthylperoxy methallyl carbonate.

The production of plastic lenses having high hardness and excellent scratch resistance is carried out by the following steps.

Diethylene glycol (bis(allyl carbonate) (a) is mixed with at least one of organic peroxides (b) having a decomposition temperature at selected half-life value for ten hours of not higher than 80° C. and at least one of specifically limited peroxycarbonates (c) represented by the general formula (1) in a given amount and the resulting mixture is dissolved and then directly or after preliminary polymerization, charged in a desired mold and polymerized and cast therein by gradually raising the temperature from room temperature to 90° C. for 10-13 hours. Thereafter, the shaped lens is taken out from the mold and washed and annealed under nitrogen atmosphere or vacuum for removing the distortion of the lens at a temperature of 100°-130° C. for 3-8 hours. In the case of annealing, use of ultraviolet ray in combination can shorten the annealing time.

The reason why the plastic lenses having high hardness and excellent scratch resistance can be obtained by using together the peroxycarbonates (c) represented by the general formula (1) is presumed as follows.

Namely, until the shaped lens is taken out from the mold, the organic peroxide (b) having a decomposition temperature at selected half-life value for ten hours of not higher than 80° C. is substantially completely decomposed and the diethylene glycol bis(allyl carbonate) (a) is substantially completely polymerized. While, the specifically limited peroxycarbonate (c) represented by the general formula (1) is not substantially decomposed due to its high decomposition temperature at selected half-life value for ten hours (for example, tert.-butylperoxy allyl carbonate has this decomposition temperature of 97° C. in 0.05 mol/l solution in benzene), and further the peroxycarbonate (c) has a good copolymerizability to the diethylene glycol bis(allyl carbonate) (a). Therefore, the peroxycarbonate (c) is copolymerized into a matrix of the polymer of diethylene glycol bis(allyl carbonate). When the lens is annealed after taking out from the mold, the peroxycarbonate (c) copolymerized into the matrix of the polymer of diethylene glycol bis(allyl carbonate) is decomposed to promote the cross-linkage between the main chains of the polymer of diethylene glycol bis(allyl carbonate).

In the present invention, the concentration of the organic peroxide (b) having the decomposition temperature at selected half-life value for ten hours of not higher than 80° C. used to diethylene glycol bis(allyl carbonate) (a) varies depending upon the kind of the organic peroxide (b), the polymerization conditions, the thickness and shape of the lens and the like, but in general, is 2–5% by weight, particularly 2.5–4% by weight. When the concentration is lower than 2% by weight, the polymerization time is increased and the hardness of the lens lowers. When the concentration exceeds 5% by weight, cracks are formed in the lens during polymerization and the obtained product cannot be used as lens.

The specifically limited peroxycarbonate (c) represented by the general formula (1) may be used in admixture of two or more of the peroxycarbonates (c).

The concentration of the peroxycarbonate (c) used to the diethylene glycol bis(allyl carbonate) (a) varies depending upon the kind of the organic peroxides, the polymerization conditions, the thickness and shape of the lens and the like but is generally 0.05–5% by weight, particularly 0.3–1% by weight. When the concentration is lower than 0.05% by weight, the satisfactory hardness cannot be obtained, while when the concentration is higher than 5% by weight, the hardness of the lens is increased but cracks are formed during annealing and the lens becomes brittle and is readily broken and one of the characteristics of the plastic lenses is lost.

When it is intended to increase the hardness by raising the using concentration of the organic peroxides (b) having the decomposition temperature at selected half-life value for ten hours of not higher than 80° C. in the use of only said peroxides (b), cracks are formed during the polymerization and the polymerized products cannot be used as plastic lens.

When the specifically limited peroxycarbonates (c) represented by the general formula (1) are used alone, the polymerization is very slow and when the polymerization temperature is raised for increasing the polymerization rate, cracks are formed, the foaming phenomenon occurs and the separation from the mold is caused. Therefore, the use of the peroxycarbonates (c) alone is not desirable.

Thus, only by using the above described organic peroxides (b) together with the above described specifically limited peroxycarbonate (c), the plastic lenses having high hardness and excellent scratch resistance can be easily produced through the conventional production step.

The hardness of the lens can be controlled by the use concentration of the specifically limited peroxycarbonate (c) represented by the general formula (1).

The thus produced plastic lenses have the equal surface hardness and scratch resistance without coating a thermosetting resin to those of the plastic lenses coated with such a resin. Accordingly, any coating of the thermoplastic resins is not necessary. Therefore, all the drawbacks of plastic lenses due to the coating of thermosetting resins are obviated. Namely, (1) the troublesome step owing to the coating of the thermosetting resin and the like is not necessary; (2) The precision of surface of plastic lenses due to the coating of thermosetting resin and the like is not deteriorated and plastic lenses having complicated shapes can be produced in a high precison; (3) The dyeability is similarly easy to that of lenses having low hardness which are not coated with a thermosetting resin; (4) The working for preventing reflection is feasible as in a glass lens.

The following examples are given for the purpose of illustration of this invention and are not intended as limitations thereof. In the examples, "parts" means parts by weight.

EXAMPLES 1–4

According to the compounding recipe shown in the following Table 2, diethylene glycol bis(allyl carbonate) (a) (trademark: CR-39, made by P.P.G. Industries, Inc.), tert.-butylperoxy allyl carbonate (c) (trademark: Peromer AC, made by Nippon Oil and Fats Company, Limited) and diisopropyl peroxydicarbonate (b) (trademark: Perroyl IPP, made by Nippon Oil and Fats Company, Limited) were mixed and dissolved, and the resulting mixture was preliminarily polymerized at a temperature of 30°–40° C. until the viscosity of the solution became 40–60 centistokes. Then, the resulting liquid prepolymer was charged into a lens-forming mold, and polymerized and cast for 18 hours while raising gradually the temperature from room temperature up to 90° C., and then the resulting hardened polymerization product was taken out from the mold. The hardened polymerization product was subjected to an ultrasonic washing, and then annealed for 8 hours in a nitrogen gas kept at 120° C. (In Example 4, annealing was carried out at 120° C. for 4 hours, and then ultraviolet ray was irradiated for 2 hours.) to obtain a plastic lens. The resulting lens samples were subjected to a pencil hardness test, a Barcol hardness test, a dyeability test and a reflection-preventing working test.

The pencil hardness test was carried out according to JIS K-5400.

The Barcol hardness test was carried out according to JIS K-6911 by using a Barcol hardness tester, Type 934-1.

The dyeability test was carried out in the following manner by using a brown dye (trademark: NIKON ORMA "Brown H", made by Nippon Kagaku Kogyo Co., Ltd.). 90 cc of the dye was dissolved in water, to obtain 1 l of the solution. The resulting dyeing solution was heated up to 92° C., and a lens sample was dipped therein for 2 minutes. Then, the sample was taken out from the solution, washed thoroughly with water and then dried. The percent transmission of the dried sample was measured.

The reflection-preventing working test was carried out by a method, wherein magnesium fluoride vapor was deposited on the surface of a lens sample at a temperature of 100° C. for 15 minutes under a reduced pressure of $10^{-4}$ mmHg under an argon atmosphere, and the surface state of the thus treated sample was observed by naked eyes.

The obtained results are shown in Table 2.

TABLE 2

|  | Example 1 | Example 2 | Example 3 | Example 4[*1] |
|---|---|---|---|---|
| CR-39 (parts) | 96.45 | 96.00 | 91.50 | 96.00 |
| Perroyl IPP (parts) | 3.50 | 3.50 | 3.50 | 3.50 |
| Peromer AC (parts) | 0.05 | 0.50 | 5.00 | 0.50 |
| Pencil hardness (H) | 4 | 7 | 8 | 7 |
| Barcol hardness | 36 | 40 | 41 | 41 |
| Dyeability (percent transmission) (%) | 54 | 52 | 52 | 53 |
| Reflection-preventing working | transparent and uniform | transparent and uniform | transparent and uniform | transparent and uniform |

TABLE 2-continued

| | Example 1 | Example 2 | Example 3 | Example 4*[1] |
|---|---|---|---|---|
| | deposited film | deposited film | deposited film | deposited film |

*[1]Annealing was carried out at 120° C. for 4 hours, and then ultraviolet ray was irradiated for 2 hours.

COMPARATIVE EXAMPLES 1 AND 2

Plastic lenses were produced in the same manner as described in Examples 1-3 by using (a) CR-39 and (b) Perroyl IPP in the compounding recipe shown in the following Table 3 without the use of (c) Peromer AC. In Comparative Example 2, the annealed lens was further applied with a silicone resin (trademark: X-12-921, made by Shinetsu Silicone Co., Ltd.), and the coated film was cured at 100° C. for 30 minutes. The resulting lenses of Comparative Examples 1 and 2 were subjected to the same pencil hardness test, Barcol hardness test, dyeability test and reflection-preventing working test as described in Examples 1-4.

The obtained results are shown in Table 3.

TABLE 3

| | Comparative Example 1 | Comparative Example 2 |
|---|---|---|
| CR-39 (parts) | 96.50 | 96.50 |
| Perroyl IPP (parts) | 3.50 | 3.50 |
| Silicone resin | not applied | applied |
| Pencil hardness (H) | 3 | 7 |
| Barcol hardness | 32 | 39 |
| Dyeability (percent transmission) (%) | 54 | 77 |
| Reflection-preventing working | deposited film is wholly cloudy | crack occurs on the surface of deposited film |

EXAMPLES 5 AND 6

Plastic lenses were produced in the same manner as described in Examples 1-3 by using (a) CR-39, (b) a mixture of Perroyl IPP and tert.-butyl peroxyisobutyrate (trademark: Perbutyl IB, made by Nippon Oil and Fats Company, Limited), and (c) Peromer AC in the compounding recipe shown in the following Table 4. The resulting plastic lenses were subjected to the same pencil hardness test, Barcol hardness test, dyeability test and reflection-preventing working test as described in Examples 1-4.

The obtained results are shown in Table 4.

TABLE 4

| | Example 5 | Example 6 |
|---|---|---|
| CR-39 (parts) | 96.00 | 91.50 |
| Perroyl IPP (parts) | 2.50 | 2.00 |
| Perbutyl IB (parts) | 1.00 | 1.50 |
| Peromer AC (parts) | 0.50 | 5.00 |
| Pencil hardness (H) | 6 | 7 |
| Barcol hardness | 37 | 40 |
| Dyeability (percent transmission) (%) | 53 | 53 |
| Reflection-preventing working | transparent and uniform deposited film | transparent and uniform deposited film |

EXAMPLES 7 AND 8

Plastic lenses were produced in the same manner as described in Examples 1-3 by using (a) CR-39, (b) Perroyl IPP, and (c) a mixture of Peromer AC and tert.-hexylperoxy methallyl carbonate in the compounding recipe shown in the following Table 5. The resulting plastic lenses were subjected to the same pencil hardness test, Barcol hardness test, dyeability test and reflection-preventing working test as described in Examples 1-4.

The obtained results are shown in Table 5.

TABLE 5

| | Example 7 | Example 8 |
|---|---|---|
| CR-39 (parts) | 96.00 | 91.50 |
| Perroyl IPP (parts) | 3.50 | 3.50 |
| Peromer AC (parts) | 0.25 | 3.00 |
| Tert.-hexylperoxy methallyl carbonate (parts) | 0.25 | 2.00 |
| Pencil hardness (H) | 7 | 8 |
| Barcol hardness | 41 | 43 |
| Dyeability (percent transmission) (%) | 52 | 51 |
| Reflection-preventing working | transparent and uniform deposited film | transparent and uniform deposited film |

EXAMPLES 9 AND 10

Plastic lenses were produced in the same manner as described in Examples 1-3 by using (a) CR-39, (b) Perroyl IPP, and (c) a mixture of Peromer AC and para-menthylperoxy allyl carbonate in the compounding recipe shown in the following Table 6. The resulting plastic lenses were subjected to the same pencil hardness test, Barcol hardness test, dyeability test and reflection-preventing working test as described in Examples 1-4.

The obtained results are shown in Table 6.

TABLE 6

| | Example 9 | Example 10 |
|---|---|---|
| CR-39 (parts) | 96.00 | 91.50 |
| Perroyl IPP (parts) | 3.50 | 3.50 |
| Peromer AC (parts) | 0.25 | 3.00 |
| Para-methyloperoxy allyl carbonate (parts) | 0.25 | 2.00 |
| Pencil hardness (H) | 6 | 8 |
| Barcol hardness | 37 | 42 |
| Dyeability (percent transmission) (%) | 54 | 52 |
| Reflection-preventing working | transparent and uniform deposited film | transparent and uniform deposited film |

What is claimed is:

1. A method for producing plastic lenses, which comprises mixing
   (a) diethylene glycol bis(allyl carbonate) with
   (b) at least one of organic peroxides having a decomposition temperature at selected half-life value for ten hours of not higher than 80° C. and
   (c) at least one of peroxycarbonates, having a decomposition temperature at selected half-life value for ten hours of not lower than 90° C., and having a radical copolymerizability to said diethylene glycol bis(allyl carbonate) (a) and represented by the formula

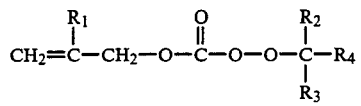

wherein $R_1$ represents a hydrogen atom or an alkyl group having 1–4 carbon atoms, $R_2$ and $R_3$ represent alkyl groups having 1–4 carbon atoms, and $R_4$ represents an alkyl group having 1–12 carbom atoms or a cycloalkyl group having 3–12 carbon atoms, as a polymerization initiator, and casting the resulting mixture in a lens-forming mold while raising the temperature to about 90° C. to form a shaped lens and then annealing said shaped lens at a temperature of about 100°–130° C; and wherein said organic peroxide (b) being used in a concentration of 2–5% by weight based on said diethylene glycol bis(allyl carbonate) (a), and said peroxycarbonate (c) is used in concentration of 0.05–5% by weight based on said diethylene glycol bis(allyl carbonate) (a).

2. A method for producing plastic lenses, which comprises mixing
(a) diethylene glycol bis(allyl carbonate) with
(b) at least one of organic peroxides having a decomposition temperature at selected half-life value for ten hours of not higher than 80° C. and
(c) at least one of peroxycarbonates, having a decomposition temperature at selected half-life value for ten hours of not lower than 90° C., and having a radical copolymerizability to said diethylene glycol bis(allyl carbonate) (a), and represented by the formula

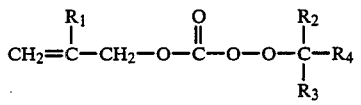

wherein $R_1$ represents a hydrogen atom or an alkyl group having 1–4 carbon atoms, $R_2$ and $R_3$ represent alkyl groups having 1–4 carbon atoms, and $R_4$ represents an alkyl group having 1–12 carbon atoms or a cycloalkyl group having 3–12 carbon atoms, as a polymerization initiator, and casting the resulting mixture in a lens-forming mold while raising the temperature to about 90° C. to form a shaped lens and then annealing said shaped lens at a temperature of about 100°–130° C.; and wherein said organic peroxide (b) being used in a concentration of 2.5–4% by weight based on said diethylene glycol bis(allyl carbonate) (a), and said peroxycarbonate (c) is used in a concentration of 0.3–1% by weight based on said diethylene glycol bis(allyl carbonate) (a).

3. The method as claimed in claim 1, wherein the organic peroxides (b) having a decomposition temperature at selected half-life value for ten hours of not higher than 80° C., used as a polymerization initiator, are at least one of organic peroxides selected from the group consisting of (I) peroxyesters, (II) peroxydicarbonates and (III) diacyl peroxides.

4. The method as claimed in claim 3, wherein the peroxyesters (I) are at least one of organic peroxides selected from the group consisting of cumyl peroxyneodecanoate, tert.-butyl peroxyneodecanoate, tert.-butyl peroxypivalate, tert.-butyl peroxy(2-ethylhexanoate), and tert.-butyl peroxyisobutyrate.

5. The method as claimed in claim 3, wherein the peroxydicarbonates (II) are at least one of organic peroxides selected from the group consisting of di-allyl peroxydicarbonate, di-methallyl peroxydicarbonate, di-isopropyl peroxydicarbonate, di-normal-propyl peroxydicarbonate, di-myristyl peroxydicarbonate, di(2-ethoxyethyl) peroxydicarbonate, di-(methoxyisopropyl) peroxydicarbonate, di-(2-ethylhexyl) peroxydicarbonate and di-(3-methyl-3-methoxybutyl) peroxydicarbonate.

6. The method as claimed in claim 3, wherein the peroxydicarbonate (II) is isopropyl peroxydicarbonate.

7. The method as claimed in claim 3, wherein the diacyl peroxides (III) are at least one of organic peroxides selected from the group consisting of 3,5,5-trimethylhexanoylperoxide, octanoyl peroxide, decanoyl peroxide, lauroyl peroxide, acetyl peroxide, meta-toluyl peroxide and benzoyl peroxide.

8. The method as claimed in claim 1, wherein the peroxycarbonates (c) are at least one of peroxycarbonates selected from the group consisting of tert.-butylperoxy allyl carbonates (IV), tert.-alkylperoxy methallyl carbonates (V), tert.-cycloalkylalkylperoxy allyl carbonates (VI) and tert.-cycloalkylalkylperoxy methallyl carbonates (VII).

9. The method as claimed in claim 8, wherein the tert.-alkylperoxy allyl carbonates (IV) are at least one of peroxycarbonates selected from the group consisting of tert.-butylperoxy allyl carbonate, tert.-hexylperoxy allyl carbonate and 1,1,3,3-tetramethylbutylperoxy allyl carbonate.

10. The method as claimed in claim 8, wherein the tert.-alkylperoxy allyl carbonate (IV) is tert.-butylperoxy allyl carbonate.

11. The method as claimed in claim 8, wherein the tert.-alkylperoxy methallyl carbonates (V) are at least one of peroxycarbonates selected from the group consisting of tert.-butylperoxy methallyl carbonate, tert.-hexylperoxy methallyl carbonate and 1,1,3,3-tetramethylbutylperoxy methallyl carbonate.

12. The method as claimed in claim 8, wherein the tert.-cycloalkylalkylperoxy allyl carbonate (VI) is para-menthylperoxy allyl carbonate.

13. The method as claimed in claim 8, wherein the tert.-cycloalkylalkylperoxy methallyl carbonate (VII) is para-menthylperoxy methallyl carbonate.

* * * * *